United States Patent [19]

Houck et al.

[11] Patent Number: 4,893,694
[45] Date of Patent: Jan. 16, 1990

[54] VSP-BASED METHOD AND APPARATUS FOR TIEING SEISMIC DATA SHOT USING DIFFERENT TYPES OF SEISMIC SOURCES

[75] Inventors: Richard T. Houck, Carrollton; J. J. Solanki, Plano, both of Tex.

[73] Assignee: Mobil Oil Corporation, New York, N.Y.

[21] Appl. No.: 270,710

[22] Filed: Nov. 14, 1988

[51] Int. Cl.$^4$ .............................................. G01V 1/36
[52] U.S. Cl. ...................................... 181/111; 367/38; 367/57; 367/59
[58] Field of Search ......................... 367/38, 57, 59; 181/111, 113; 364/421

[56] References Cited

U.S. PATENT DOCUMENTS

| 3,351,899 | 11/1967 | Luehrmann et al. | 367/23 |
| 4,170,002 | 10/1979 | Strange | 367/23 |
| 4,597,464 | 7/1986 | Chelminski | 367/144 |
| 4,627,036 | 12/1986 | Wyatt | 367/57 |
| 4,781,140 | 11/1988 | Bell et al. | 114/244 |
| 4,794,573 | 12/1988 | Bell et al. | 367/57 |

Primary Examiner—Thomas H. Tarcza
Assistant Examiner—Ian J. Lobo
Attorney, Agent, or Firm—Alexander J. McKillop; Charles J. Speciale; George W. Hager, Jr.

[57] ABSTRACT

VSP-based method for tieing surface data shot with different types of seismic sources together. VSP data is acquired using the same types of seismic sources utilized to acquire the surface data. The acquired VSP data is used to produce a correction operator for application to the surface data.

25 Claims, 7 Drawing Sheets

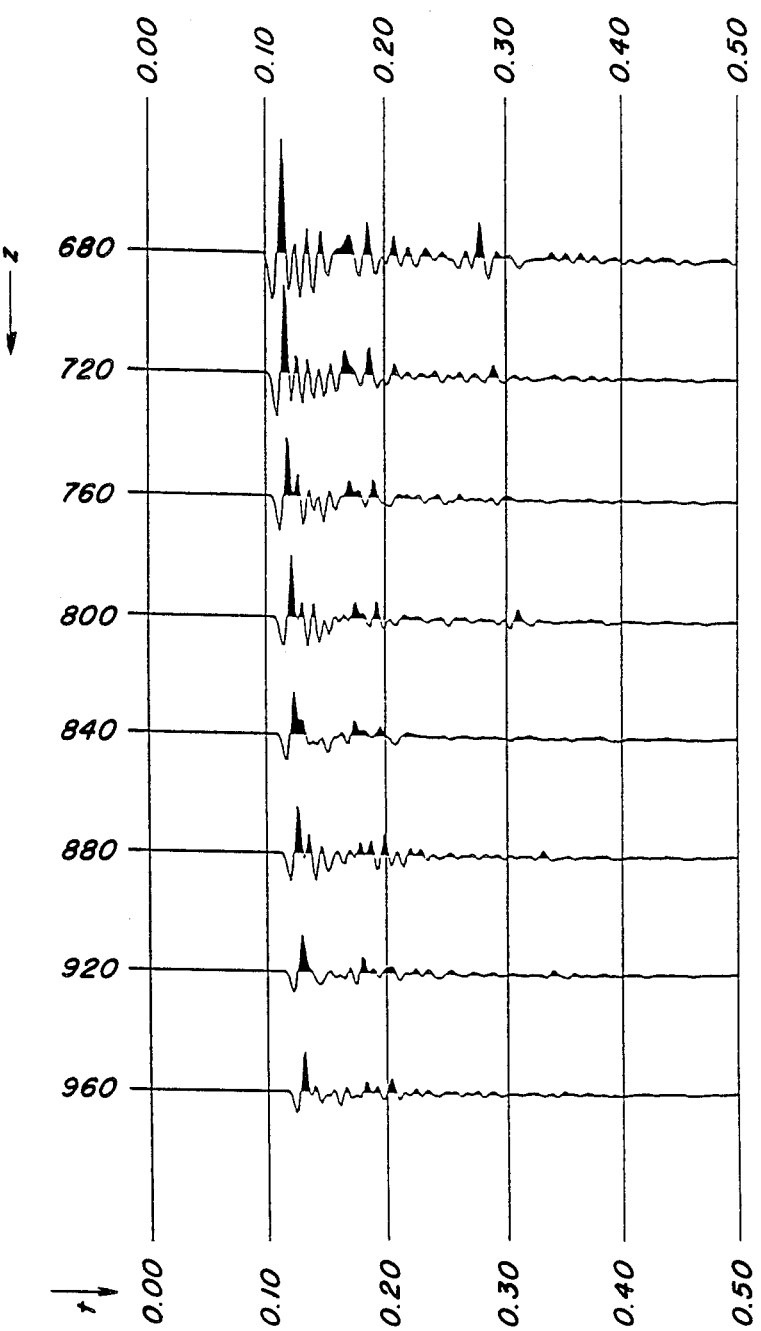

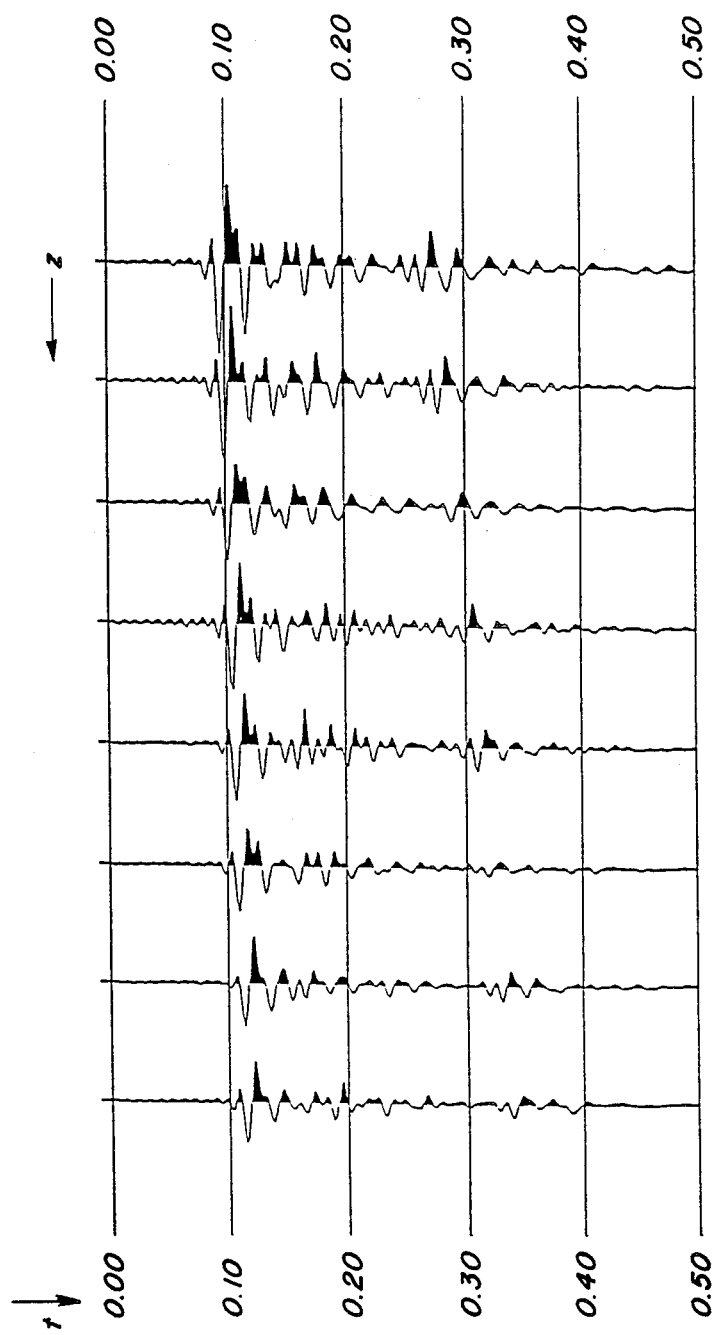

VSP-BASED METHOD AND APPARATUS FOR TIEING SEISMIC DATA SHOT USING DIFFERENT TYPES OF SEISMIC SOURCES

BACKGROUND OF THE INVENTION

This invention relates to seismic exploration and, more particularly, to a method which utilizes seismic data acquired by vertical seismic profile (VSP) exploration to tie seismic data shot using different types of seismic sources together.

To conduct seismic exploration of the earth, it is common practice to deploy geophones along a line of exploration of the surface of the earth for recording the vibrations of the earth in response to the generation of seismic energy. When the vibrations so recorded are caused by a seismic source activated at a known time and location, the recorded data can be processed by a computer in known ways to produce an image of the subsurface. The image thus produced is commonly interpreted by geophysicists to detect the possible presence of valuable hydrocarbons.

Seismograms are commonly recorded as digital samples representing the amplitude of a received signal as a function of time. Since seismograms typically correspond to a line of exploration along the surface of the earth, the acquired digital samples can be formed into x-t arrays with each sample in the array representing the amplitude of the seismic signal as a function of horizontal distance and time. When such arrays are visually reproduced, by plotting or the like, seismic sections are produced.

Numerous techniques for exploring the earth to acquire seismic data are well known. One such technique utilizes explosive sources for generating seismic energy into the earth. The explosive energy may be generated into the earth by an air gun, dynamite or the like, reflected off subsurface reflecting interfaces and detected by geophones located on the surface. A second well known technique utilizes a vibratory source for generating vertically-oriented seismic energy into the earth. Like explosive seismic exploration systems, vibrative energy propagates into the subsurface where it is reflected off subsurface reflecting interfaces and directed towards the surface for detection by geophones positioned on the surface. The vibrative exploration system may include, for example, the hydraulic vibrator marketed under the trademark "VIBROSEIS" by the Continental Oil Company.

The geophones positioned along the surface should record seismic data capable of being tied together when explosive and vibrative energy are alternately generated into the earth and reflected off the same interfaces. By "tied" data, it is intended to refer to seismic data which, despite corresponding to different types of seismic sources, includes the same amplitude and phase information for the subsurface formation. Such a result should occur because both types of seismic energy propagate through the same subsurface mediums and therefore should generate similar information regarding the characteristics of the subsurface. However, in many cases, the tieing of the two types of recorded data has not been possible due to the differences between the source waveforms of the generated explosive energy and vibrative energy.

Prior attempts to tie seismic data shot using different types of seismic sources attempted to correct for the differences between the source waveforms of the different types of seismic sources. These attempts proved to be unsatisfactory because, as the source waveform was unmeasurable, numerous assumptions regarding the seismic exploration were required. One such attempt to tie seismic data together relied on the assumption that the explosive and vibrative sources were minimum phase. Based on this assumption, spiking deconvolution would be applied to the acquired seismic data to determine what was incorrectly presumed to be the minimum phase amplitude spectrum of the source waveform. However, because seismic sources may not always be presumed to be minimum phase, particularly vibratory sources, the application of spiking deconvolution would often produce an incorrect minimum phase amplitude spectrum. Based on an often incorrect amplitude spectrum, the acquired data would then be corrected for differences in the source waveform in an attempt to tie seismic data from the different sources together.

A second prior attempt to tie seismic data from explosive and vibration sources together utilized the acquired vibrator data to estimate the amplitude spectrum of the vibrator source waveform. The minimum phase operator would then be determined from the estimation of the amplitude spectrum of the vibrator source waveform. Having determined the minimum phase operator, the acquired data could be corrected for differences in the source waveforms of the explosive and vibrative data to again attempt to tie the data from the two sources. However, estimates of the vibrator source waveform from the acquired vibrative seismic data were not always accurate. The vibrator source waveform error would then be propagated into the determination of the minimum phase operator and the correction of the acquired data, thereby resulting in a less than satisfactory "tie" of vibrative and explosive data.

Recently, the use of Vertical Seismic Profile (hereafter referred to as "VSP") exploration techniques have become increasingly popular. One method of conducting VSP exploration is to generate seismic energy, either vibrative or explosive, from a seismic source located on the surface into the earth. The generated energy is reflected by subsurface reflecting interfaces and detected by a geophone located in a borehole. Preferably, the source should be placed such that the subsurface reflection points generally lie in the plane containing the borehole and the source location. For a conventional VSP survey, the geophone would typically be moved to a new location for each shot with the distance between geophone locations being some constant distance such as 50 feet. See, for example, U.S. Pat. No. 4,627,036 issued to Wyatt and U.S. Pat. No. 4,597,464 issued to Chelminski for typical methods and apparatus for conducting VSP exploration of the subsurface.

SUMMARY OF THE INVENTION

It is an object of this invention to tie seismic data acquired by the generation of different types of seismic energy into the earth.

It is another object of this invention to tie seismic data separately acquired by generating vibrative and explosive seismic energy into the earth using information acquired during a Vertical Seismic Profile survey.

It is a feature of this invention to correct seismic data separately acquired using different types of seismic sources for differences in the source waveforms of the different seismic sources.

Two sets of seismic data relating to the characteristics of a subsurface formation are acquired using different types of seismic sources such as an explosive seismic source and a vibrative seismic source. To correct the acquired seismic data sets for the differences in the source waveforms of the different seismic sources, VSP surveys of the subsurface formation are conducted using the same types of seismic sources utilized to acquire the two sets of seismic data. The acquired VSP data is used to produce a correction operator or operators to be applied to the sets of seismic data to correct the data sets for differences in the source waveforms, thereby tieing the data sets acquired using the different types of seismic sources.

The above and other objects, advantages and features of the invention will be more readily understood from the following detailed description of the invention, which is provided in connection with the accompanying drawings.

BRIEF DESCRIPTION OF THE DRAWINGS

FIG. 2 is a seismic record shot using an explosive source with the VSP exploration system illustrated in FIG. 4;

FIG. 3 is a seismic record shot using a vibrative source with the VSP exploration system illustrated in FIG. 4;

DESCRIPTION OF THE INVENTION

While the techniques described herein are directed towards the receipt of vertical seismic profile (VSP) data from an acoustic pulse receiver located in a borehole beneath the earth's surface and horizontally offset from an acoustic pulse generator on the surface for generating pulses to be reflected from a reflecting interface and detected by the acoustic pulse receiver, it should be clearly understood that the techniques set forth below are equally applicable to the receipt of vertical seismic profile data from a acoustic pulse receiver located on the surface and horizontally offset from a acoustic pulse generator located in the borehole for generating pulses to be reflected form the reflecting interface and detected by the acoustic pulse receiver.

Figure 1:
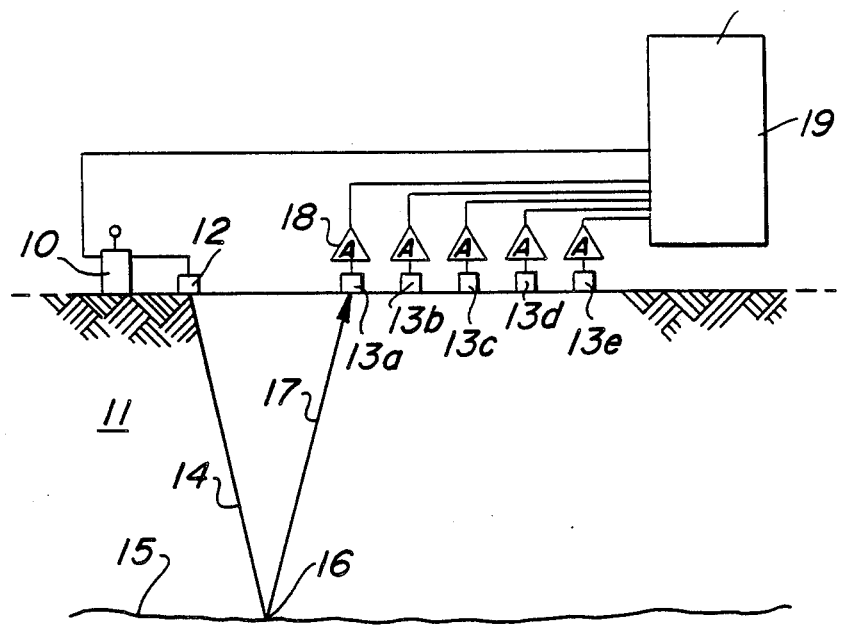
FIG. 1 illustrates a typical surface exploration system for acquiring seismic data.

Referring first to FIG. 1, a conventional explosive surface seismic exploration system used for the exploration of subsurface formations is illustrated. Exploration commences upon the actuation of blaster 10 which actuates a generator of acoustic energy, such as an airgun or a small charge of an explosive such as dynamite, at shot point 12. The charge of explosive produces an acoustic pulse which travels through subsurface formation 11. The wave generator initiates the travel of seismic waves from the shot point 12 downwardly through the earth strata. The downgoing wave 14 is reflected by reflecting interface 15 of a relatively thick high velocity bed at point 16. The reflected wave travels along path 17 to detector 13a. Electrical signals generated by detectors 13 a-eare applied to amplifier 18, which includes the usual adjustable filters, and the output of amplifier 18 is, in turn, applied to recorder 19. Surface data which, for example, may comprise a series of seismic traces or "seismic record", may be acquired by the standard seismic exploration techniques described above to yield valuable information regarding the geophysical characteristics of the explored subsurface.

Seismic data may also be acquired by generating vibrative seismic energy into the subsurface using a vibrative source such a an acoustic vibrator in place of the explosive source. Like the explosive case, the generated vibrative energy would be reflected off interface 15 and detected by detectors 13a–e. However, the seismic records generated using explosive and vibratory sources are very different. Such a result is due to distinct differences between the source waveforms of the explosive and vibrative energy imparted into the subsurface. Such differences between the seismic records prevent the two records from being used together when analyzing the explored subsurface.

Figure 4:
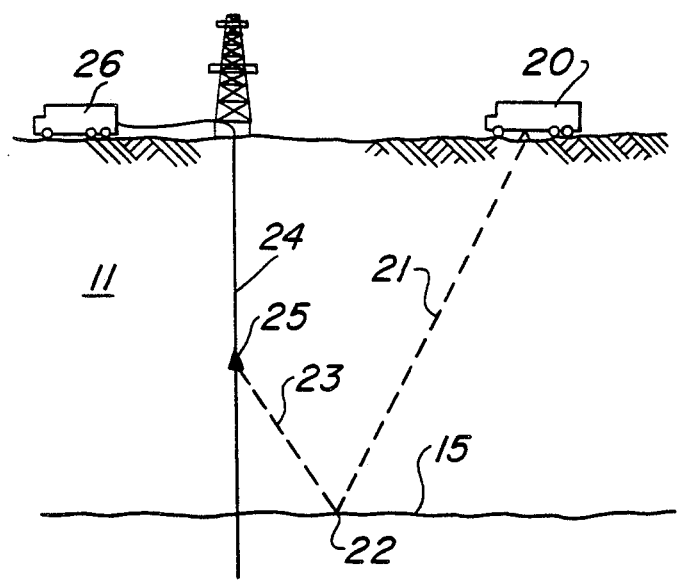
FIG. 4 illustrates typical Vertical Seismic Profile exploration system.

Referring next to FIG. 4, a typical VSP exploration system is illustrated. It should be noted, however, that while in the illustrated exploration system vibratory source 20 imparts energy into earth formation 11 to conduct VSP exploration, it is contemplated that additional VSP exploration of earth formation 11 is to be conducted utilizing an explosive source such as dynamite or an airgun in place of the vibrative source. FIGS. 2 and 3 show VSP's acquired using vibrator and air gun sources. In the illustrated VSP exploration system, geophone 25 is located at a desired depth in borehole 24. For the location of geophone 25 illustrated, seismic energy generated into formation 11 by source 20 travels along path 21 until reflected off reflecting interface 15 at point 23. The reflection travels along path 23 and is detected by geophone 25. The output produced from geophone 25 is recorded by recording truck 26. Exploration continues by moving geophone 25 to a new location and repeating the shot. After the shot reflection is recorded at a series of borehole depths, seismic source 20 would be moved to a next location and the procedure repeated.

For the reasons previously discussed, the seismic data acquired by separate explosive and vibrative explorations of the same area cannot be tied together because of differences in the source waveforms of the explosive and vibrative sources. The capability to tie such data sets together is desirable because the two sets of seismic data could be used together to analyze the subsurface formation. For example, data sets may have been acquired at different times using different sources, or operational considerations may require that different sources be used during a single survey. Because of differences between the source signatures, interpretation of these two data sets will produce different results. Therefore, data sets acquired using different sources cannot be combined in a single interpretation of the subsurface unless the data is first compensated for differences between sources.

Figure 5:
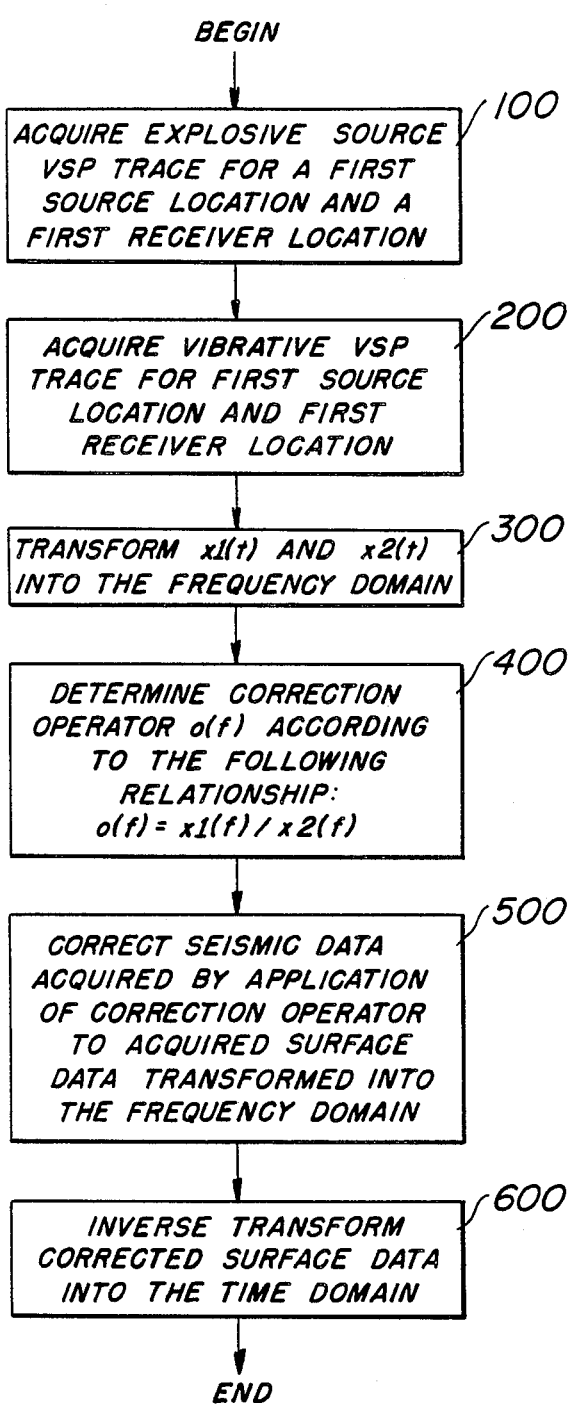
FIG. 5 illustrates, in flow chart form, a first method of tieing seismic data shot with different sources utilizing VSP data acquired with the VSP exploration system illustrated in FIG. 4.

Referring next to FIG. 5, the first method of adjusting the seismic records shot with different sources to compensate for differences in the source waveforms of the two is now described. Compensation is to be achieved by estimating and removing the amplitude and phase differences between the two sources. Commencing at step 100, a first VSP trace is acquired by generating explosive seismic energy into the subsurface and recording the resultant reflections from subsurface interfaces in accordance with standard VSP exploration techniques. At step 200, a second VSP trace is acquired by generating vibrative seismic energy into the subsurface and recording the resultant reflections from subsurface interfaces, again in accordance with standard VSP exploration techniques. Both VSP traces are to be acquired for the same source and receiver locations. For the two VSP traces acquired for identical source and receiver positions using two different sources, one explosive and one vibrative and each having a different source waveform, the VSP traces may be represented by Equations (1) and 2) below:

$$X1(t) = s1(t) * r(t) \tag{1}$$

$$X2(t) = s2(t) * r(t) \tag{2}$$

where:
- X1(t) = the VSP trace acquired by generating a first type, i.e. explosive, of seismic energy into the earth;
- X2(t) = the VSP trace acquired by generating a second type, i.e., vibrative, of seismic energy into the earth;
- s1(t) = the source waveform for the first type of energy source;
- s2(t) = the source waveform for the second type of energy source;
- r(t) = the earth reflectivity sequence; and
- * = the convolution operator.

It should be noted, however, that for the relationship set forth in Equations (1) and (2), it is assumed that the arrival sequence at the receiver is the same for both sources. This assumption corresponds to the specified situation where the source and receiver positions are identical for the two VSPs.

Next, an operator is designed to correct for both amplitude and phase differences between the sources. When the source and receiver locations for the two VSPs are the same, a correction operator for correcting both the amplitude and phase differences between the sources can be produced by spectral division in the frequency domain according to the following relationship:

$$O(f) = X1(f)/X2(f) = S1(f)/S2(f) \tag{3}$$

Accordingly, at step 300, acquired VSP traces x1(t) and x2(t) are transformed into the frequency domain by application of the fast Fourier transform which provides that for a seismic trace x(t), the Fourier transform may be represented:

$$X(f) = x(t)e^{-j2\pi ft} dt \tag{4}$$

$$X(f) = R(f) + jI(f) = |X(f)| e^{j\theta(f)} \tag{5}$$

where:
- R(f) is the real part of the Fourier transform;
- I(f) is the imaginary part of the Fourier transform;
- X(f) is the Fourier spectrum of x(t);
- |X(f)| is the amplitude spectrum and is given by $[R^2(f) + I^2(f)]^{1/2}$; and
- θ(f) is the phase angle of the Fourier transform and is given by $\tan^{-1}[I(f)/R(f)]$.

Proceeding to step 400, the correction operator O(f) is calculated according to Equation (3) by dividing the seismic traces in the frequency domain.

Having determined the correction operator O(f), the acquired surface data may now be corrected for differences in the explosive source signature and the vibrative source signature, thereby tieing the surface data acquired from different sources together. At step 500, therefore, surface data acquired by the different sources is now corrected. For example, a surface trace y2(t) shot using the second, i.e. vibrative, source may be corrected for differences in the source signature and tied to the surface data acquired using the first seismic source by applying correction operator (f) to y2(t) in the frequency domain.

More specifically, assuming that two sets of surface data are shot using the explosive source and the vibrative source, respectively, the surface data may be represented according to the following relationships:

$$y1(t) = s1(t) * r'(t) \tag{6a}$$

$$y2(t) = s2(t) * r'(t) \tag{6b}$$

which correspond to Equations (7a–b) in the frequency domain:

$$Y1(f) = S1(f)R'(f) \tag{7a}$$

$$Y2(f) = S2(f)R'(f) \tag{7b}$$

Seismic data shot using the second source may be tied to the seismic data shot with the first source by applying the correction operator O(f) to the frequency domain seismic data:

$$O(f)Y2(f) = O(f)S2(f)R'(f) \tag{8}$$

which simplifies to:

$$O(f)Y2(f) = S1(f)S2(f)R'(f)S2(f) = S1(f)R'(f) \tag{9}$$

After correction by applying operator O(f) to the surface data shot using the second type of seismic source, the corrected surface data corresponding to the second source is inverse transformed at step 600 into the time domain, thereby tieing the surface traces acquired using the two different seismic sources together.

Figure 6:
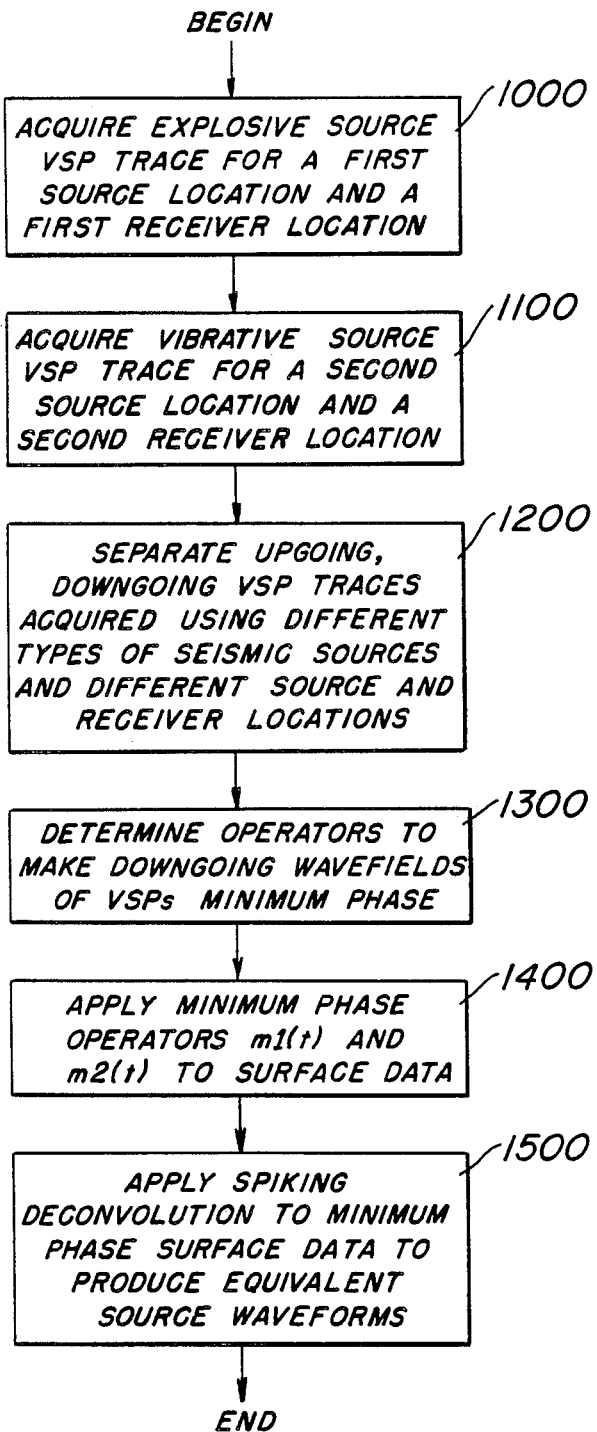
FIG. 6 illustrates, in flow chart form, a second method of tieing seismic data shot with different sources utilizing VSP data acquired with the VSP exploration system of FIG. 4.
Figure 7:
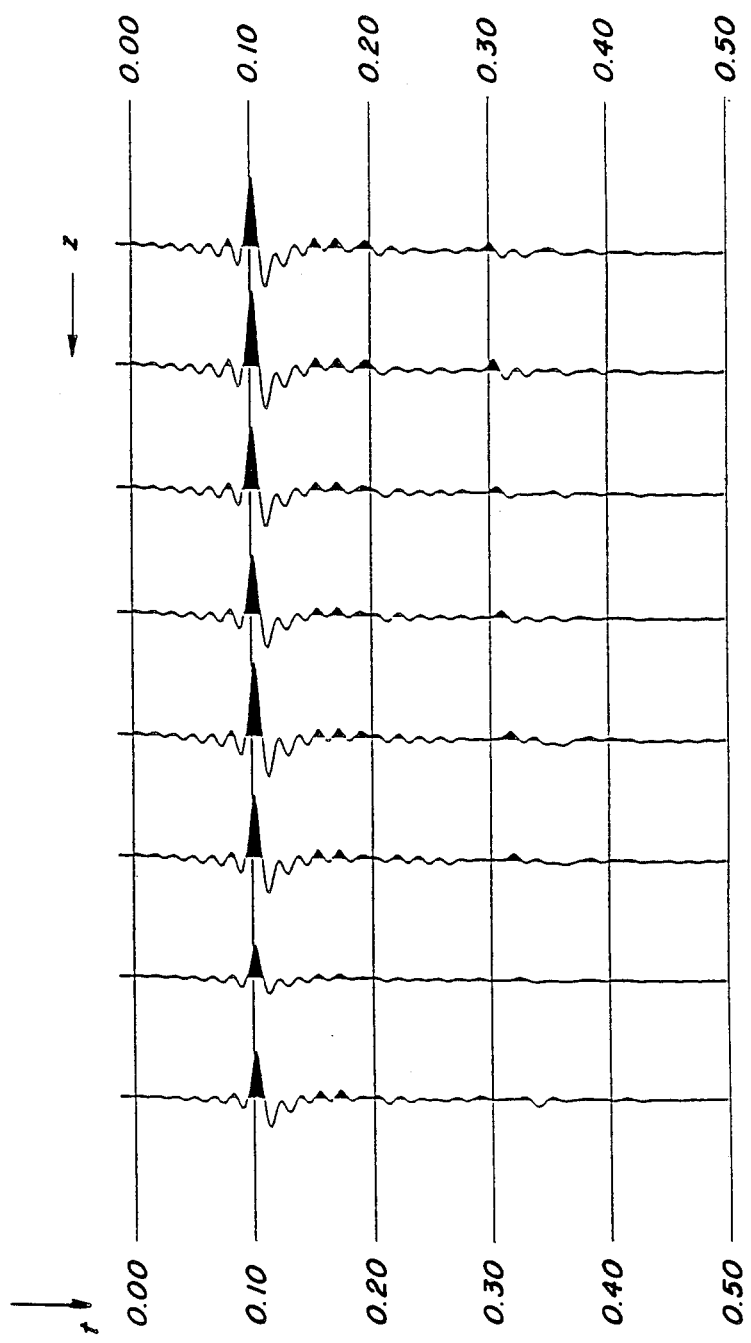
FIGS. 7 and 8 are the seismic records of FIGS. 2 and 3, respectively, tied together in accordance with the methods of the present invention by correcting for the source waveform differences between the two.
Figure 8:
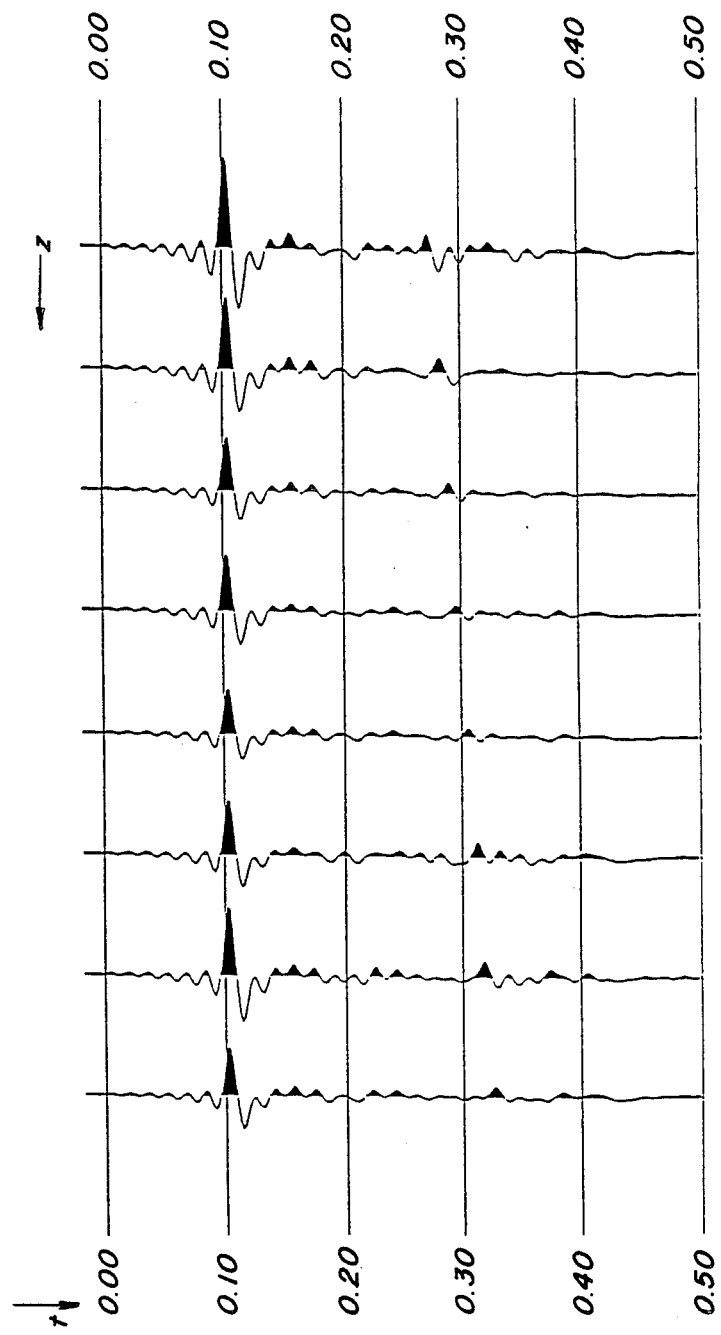

Referring next to FIG. 6, the second method of adjusting the seismic records shot with different sources to compensate for differences in the source waveforms of the two is now described. In this embodiment of the invention, a method of tieing surface data shot with different sources where the acquired VSP traces also shot using the different sources and utilized to correct the surface data are acquired for source and receiver positions which are not identical.

Commencing at step 1000, a first VSP trace is acquired by generating explosive seismic energy into the subsurface at a first source location and recording the resultant reflections from subsurface interfaces at a first receiver location in accordance with standard VSP exploration techniques. At step 1100, a second VSP trace is acquired by generating vibrative seismic energy into the subsurface at a second source location and recording the resultant reflections from subsurface interfaces at a second receiver location, again in accordance with standard VSP exploration techniques. Here, it is assumed that both the first and second source locations and the first and second receiver locations differ.

Proceeding to step 1200, the downgoing and upgoing wavefields of the VSP traces acquired using different types of seismic sources at different source and receiver locations are separated. Separation between the downgoing and upgoing wavefields may be accomplished according to any one of numerous techniques well known in the art. The downgoing wavefield of VSP traces y1(t) and y2(t) acquired using different types of seismic sources and different source and receiver locations may be represented according to Equations (10) and (11) below.

$$y1(t) = s1(t) * d1(t) \tag{10}$$

$$y2(t) = s2(t) * d2(t) \tag{11}$$

where:
- y1(t) = the downgoing wavefield of the first VSP trace acquired at a first receiver location by generating a first type, i.e. explosive, of seismic energy into the earth at a first source location;
- y2(t) = the downgoing wavefield of the second VSP trace acquired at a second receiver location by generating a second type, i.e., vibrative, of seismic energy into the earth at a second source location;
- s1(t) = the source waveform for the first type of energy source;
- s2(t) = the source waveform for the second type of energy source;
- d1(t) = the downgoing arrival sequence for the first VSP;
- d2(t) = the downgoing arrival sequence for the second VSP;
- * = the convolution operator.

It should be noted that while the downgoing arrival sequences d(1) and d(t) are not the same, they are both minimum phase because they are multiple sequences. Such a consideration is important because it permits phase operators m1(t) and m2(t) which would transform the two downgoing wavefields y1(t) and y2(t) of the VSPs to their minimum phase equivalents operators to be found. Furthermore, if phase operators m1(t) and m2(t) can be found, then the two different source waveforms can be transformed into minimum phase as well.

Proceeding to step 1300, the desired phase operators can be computed from the downgoing wavefields y1(t), y2(t) of the VSPs in the frequency domain using a Hilbert Transform approach or in the time domain using a Weiner filter approach. When seismic data is minimum phase, as is the case for the downgoing wavefields selected in the present method, the frequency domain minimum phase operator can be obtained as the Hilbert transform of the logarithm of the amplitude spectrum of the downgoing wavefield D2(f) More specifically, $$m1(f) = H[\log|D1(f)|] \tag{12}$$

$$m1(f) = 1/\pi f * \log|D1(f)| \tag{13}$$

and $$m2(f) = H[\log|Y2(f)|] \tag{14}$$

$$m2(f) = 1/\pi f * \log|Y2(f)| \tag{15}$$

where * is the convolution operator.

Alternately, the phase operators can be determined from the downgoing wavefields y1(t), y2(t) of the VSP traces in the time domain using a Weiner filter approach. Here, it should be noted that as the downgoing wavefields are minimum phase, the minimum phase operator would be the inverse of the inverse of the downgoing traces, i.e.:

$$m1(t) = 1/(1/d1(t)) \tag{16}$$

$$m2(t) = 1/(1/d2(t)) \tag{17}$$

Methods and apparatus for deriving inverse filters are well known in the art. See U.S. Pat. Nos. 3,275,980 issued to Foster and 3,076,176 issued to Lawrence. may now be applied to source waveforms s1(t) and s2(t) to make the two source waveforms minimum phase. Accordingly, at step 1400, the minimum phase operators m1(t) and m2(t) are applied to the acquired surface data y1(t) and y2(t) to make the surface data minimum phase. Application of the minimum phase operators m1(t) and m2(t) to the surface data y1(t) and y2(t) may be achieved by convolving the two respectively in the time domain or multiplying the two in the frequency domain.

$$y1'(t)\ m1(t) * y1(t) \tag{18}$$

$$y2'(t)\ m2(t) * y2(t) \tag{19}$$

Proceeding to step 1500, the minimum phase versions of the acquired seismic data may then be passed through spiking deconvolution. Well known spiking deconvolution techniques such as those taught by U.S. Pat. No. 3,396,365 issued to Kerns may thus be applied with the result that the same source waveform will be produced for both data sets.

Thus, there has been described and illustrated herein a method for processing sets of seismic data shot utilizing different types of seismic sources such that the two data sets may be tied together for later processing and interpretation. However, those skilled in the art will recognize that many modifications and variations besides those specifically mentioned may be made in the techniques described herein without departing substantially from the concept of the present invention. Accordingly, it should be clearly understood that the form of the invention described herein is exemplary only, and is not intended as a limitation on the scope of the present invention.

What is claimed is:

1. A method for tieing a first seismic trace produced by generating a first type of seismic energy characterized by a first source waveform into the subsurface and recording its reflection and a second seismic trace produced by generating a second type of seismic energy characterized by a second source waveform different from that of said first source waveform into the subsurface and recording its reflecting comprising the steps of:
    producing a first VSP by generating said first type of seismic energy into the subsurface at a first location and recording its reflection at a second location;
    producing a second VSP by generating said second type of seismic energy into the subsurface at said first location and recording its reflection at a second location;
    producing a correction operator from said first and second VSPs; and applying said correction operator to said second seismic trace to tie said second seismic trace to said first seismic trace.

2. The method according to claim 1 wherein the step of producing said correction operator from said first and second VSPs further comprises the steps of:
   transforming said first and second VSPs into the frequency domain;
   producing said correction operator by dividing said transformed VSPs in the frequency domain.

3. The method according to claim 2 wherein the step of applying said correction operator to said second seismic trace to tie said second seismic trace to said first seismic trace further comprises the steps of:
   transforming said second seismic trace into the frequency domain;
   applying said correction operator to said transformed second seismic trace to produce a frequency domain corrected seismic trace; and
   inverse transforming said frequency domain corrected seismic trace to the time domain.

4. The method according to claim 1 wherein said first type of seismic source is explosive and said second type of seismic source is vibrative.

5. The method according to claim 4 wherein the step of producing said correction operator from said first and second VSPs further comprises the steps of:
   transforming said first and second VSPs into the frequency domain;
   producing said correction operator by dividing said transformed VSPs in the frequency domain.

6. The method according to claim 5 wherein the step of applying said correction operator to said second seismic trace to tie said second seismic trace to said first seismic trace further comprises the steps of:
   transforming said second seismic trace into the frequency domain;
   applying said correction operator to said transformed second seismic trace to produce a frequency domain corrected seismic trace; and
   inverse transforming said frequency domain corrected seismic trace to the time domain.

7. A seismic exploration system comprising:
   means for generating a first type of seismic energy into the earth, said first type of seismic energy characterized by a first source waveform;
   means for generating a second type of seismic energy into the earth, said second type of seismic energy characterized by a second source waveform different from that of said first source waveform;
   means for receiving reflections of said first type of seismic energy and reflections of said second type of seismic energy off subsurface reflecting interfaces;
   means for producing a first VSP data set for the subsurface, said first VSP data set produced by generating said first type of seismic energy into the subsurface at a first location and recording reflections off reflecting interfaces at a second location;
   means for producing a second VSP data set for the subsurface, said second VSP data set produced by generating said second type of seismic energy into the subsurface at said first location and recording reflections off reflecting interfaces at said second location; and
   means for applying said first VSP data set and said second VSP data set to said received reflections to tie said first type of reflections and said second type of reflections together.

8. The seismic exploration system according to claim 7 wherein said means for applying said first VSP data set and said second VSP data set further comprises:
   means for producing a spectral ratio of said first VSP data set and said second VSP data set; and
   means for tieing said first type of received reflections and said second type of received reflections by applying said spectral ratio to said received reflections.

9. The seismic exploration system according to claim 7 wherein said means for generating a first type of seismic energy into the earth further comprises means for generating explosive energy into the earth and said means for generating a second type of seismic energy into the earth further comprises means for generating vibrative energy into the earth.

10. The seismic exploration system according to claim 9 wherein said first VSP data set is produced by generating explosive energy into the subsurface and said second VSP data set is produced by generating vibrative energy into the subsurface.

11. The seismic exploration system according to claim 10 wherein said means for applying said first VSP data set and said second VSP data set to said received reflections further comprises means for applying said produced explosive source VSP data and said produced vibrative source VSP data to said received reflections.

12. The seismic exploration system according to claim 11 wherein said means for applying said produced explosive source VSP data and said produced vibrative source VSP data to said received reflections further comprises:
   means for producing a spectral ratio of said explosive VSP data and said vibrative VSP data; and
   means for tieing said received explosive reflections and said receive vibrative reflections together by applying said spectral ratio to said received reflections.

13. A method for tieing a first seismic trace produced by generating a first type of seismic energy into the subsurface and recording its reflection and a second seismic trace produced by generating a second type of seismic energy into the subsurface and recording its reflection, said first type of seismic energy characterized by a first source waveform and said second type of seismic energy characterized by a second source waveform different from that of said first source waveform, comprising the steps of:
   producing a first VSP by generating said first type of seismic energy into the subsurface and recording its reflection, said first VSP comprised of an upgoing wavefield and a downgoing wavefield;
   producing a second VSP by generating said second type of seismic energy into the subsurface and recording its reflection, said second VSP comprised of an upgoing wavefield and a downgoing wavefield, said downgoing wavefield of said second VSP being different from that of said first VSP;
   separating said upgoing wavefield and said downgoing wavefield for said first VSP;
   separating said upgoing wavefield and said downgoing wavefield for said second VSP;
   determining a first minimum phase operator for said first VSP from said downgoing wavefield for said first VSP;

determining a second minimum phase operator for said second VSP from said downgoing wavefield for said second VSP; and applying said first minimum phase operator to said first seismic trace and applying said second minimum phase operator to said second seismic trace and applying spiking deconvolution to said first and second applied traces to tie said first and second seismic traces together.

14. The method according to claim 13 wherein said minimum phase operators for said VSPs are produced by determining the Hilbert transform of the logarithm of the frequency domain amplitude spectrum of the downgoing traces.

15. The method according to claim 13 wherein said minimum phase operators for said VSPs are produced by determining the inverse of the downgoing traces.

16. The method according to claim 13 wherein the step of applying said first minimum phase operator to said first seismic trace and applying said second minimum phase operator to said second seismic trace further comprises the step of convolving said first minimum phase operator and said first seismic trace in the time domain and convolving said second minimum phase operator and said second seismic trace in the time domain.

17. The method according to claim 13 wherein the step of applying said first minimum phase operator to said first seismic trace and applying said second minimum phase operator to said second seismic trace further comprises the step of multiplying said first minimum phase operator and said first seismic trace in the frequency domain and multiplying said second minimum phase operator and said second seismic trace in the frequency domain.

18. The method according to claim 13 wherein said first type of seismic source is explosive and said second type of seismic source is vibrative.

19. A seismic exploration system comprising:
means for generating a first type of seismic energy into the earth, said first type of seismic energy characterized by a first source waveform;
means for generating a second type of seismic energy into the earth, said second type of seismic energy characterized by a second source waveform different from that of said first source waveform;
means for receiving reflections of said first type of seismic energy off subsurface reflecting interfaces;
means for receiving reflections of said second type of seismic energy off subsurface reflecting interfaces;
means for producing a first VSP data set for the subsurface;
means for producing a second VSP data set for the subsurface;
means for separating downgoing and upgoing wavefields of VSP data;
means for determining a first minimum phase operator for said first VSP from said downgoing wavefield for said first VSP;
means for determining a second minimum phase operator for said second VSP from said downgoing wavefield for said second VSP, said downgoing wavefield for said second VSP being different from that of said first VSP; and
means for applying said first minimum phase operator to said first type of reflections and applying said second minimum operator to said second type of reflections and applying spiking deconvolution to said first and second applied traces to tie said first type of reflections and said second type of reflections together.

20. The seismic exploration system according to claim 19 further comprising means for determining the Hilbert transform of the logarithm of the frequency domain amplitude spectrum of the downgoing traces.

21. The seismic exploration system according to claim 19 further comprising means for determining the inverse of the inverse of the downgoing traces.

22. The seismic exploration system according to claim 19 further comprising means for convolving minimum phase operators and received reflections in the time domain.

23. The seismic exploration system according to claim 19 further comprising means for multiplying received reflections and minimum phase operators in the frequency domain.

24. The seismic exploration system according to claim 19 wherein said means for generating a first type of seismic energy into the earth further comprises means for generating explosive energy into the earth and said means for generating a second type of seismic energy into the earth further comprises means for generating vibrative energy into the earth.

25. The seismic exploration system according to claim 24 wherein said first VSP data set is produced by generating explosive energy into the subsurface and said second VSP data set is produced by generating vibrative energy into the subsurface.

* * * * *

UNITED STATES PATENT AND TRADEMARK OFFICE
CERTIFICATE OF CORRECTION

PATENT NO. : 4,893,694

DATED : January 16, 1990

INVENTOR(S) : Richard T. Houck and J. J. Solanki

It is certified that error appears in the above-identified patent and that said Letters Patent is hereby corrected as shown below:

Col. 3, line 55, "a" should be -- an --

Col. 3, line 58, "form" should be -- from --

Col. 4, line 6, "a-eare" should be -- a-e are --

Col. 6, line 14, "(f)" should be -- O(f) --

Col. 6, line 41, In equation (9), the portion between the two "=" symbols should read -- S1(f)S2(f)R'(f)/S2(f) --

Col. 8, line 13, After "Lawrence." insert -- The determined minimum phase operators m1(t) and m2(t) --

Col. 8, lines 25-27, In equations (18) and (19), before "m" insert -- = --

Col. 8, line 59, "reflecting" should be -- reflection --

Col. 10, line 39, "receive" should be -- received --

Signed and Sealed this

Thirty-first Day of March, 1992

*Attest:*

HARRY F. MANBECK, JR.

*Attesting Officer*   *Commissioner of Patents and Trademarks*